US011648534B2

(12) United States Patent
Wei et al.

(10) Patent No.: US 11,648,534 B2
(45) Date of Patent: May 16, 2023

(54) OXIDATION CATALYST FOR LEAN COMPRESSED NATURAL GAS ENGINE

(71) Applicant: BASF CORPORATION, Florham Park, NJ (US)

(72) Inventors: Xinyi Wei, Princeton, NJ (US); Olga Gerlach, Ludwigshafen (DE); Emily Schulman, Princeton, NJ (US); Andreas Sundermann, Bensheim (DE); Stanley Roth, Yardley, PA (US); Limiao An, Shanghai (CN)

(73) Assignee: BASF CORPORATION, Florham Park, NJ (US)

( * ) Notice: Subject to any disclaimer, the term of this patent is extended or adjusted under 35 U.S.C. 154(b) by 1018 days.

(21) Appl. No.: 16/158,968

(22) Filed: Oct. 12, 2018

(65) Prior Publication Data

US 2019/0046958 A1   Feb. 14, 2019

Related U.S. Application Data

(63) Continuation of application No. PCT/IB2017/052120, filed on Apr. 12, 2017.

(30) Foreign Application Priority Data

Apr. 14, 2016   (CN) .......................... 201610232574.0

(51) Int. Cl.
 B01J 23/42   (2006.01)
 B01J 23/44   (2006.01)
 (Continued)

(52) U.S. Cl.
 CPC ............. B01J 23/42 (2013.01); B01J 21/066 (2013.01); B01J 23/44 (2013.01); B01J 35/0026 (2013.01);
 (Continued)

(58) Field of Classification Search
 CPC ...... B01J 23/42; B01J 21/066; B01J 35/0026; B01J 35/04; B01J 35/1014; B01J 35/1038;
 (Continued)

(56) References Cited

U.S. PATENT DOCUMENTS 6,034,029 A    3/2000  Wulff-Doring et al.
7,569,512 B2 *  8/2009  Weissman .............. B01J 21/066
                                               502/325
(Continued)

FOREIGN PATENT DOCUMENTS

JP      2013169480 A1    9/2013
KR    20140111132 A  *   9/2014
(Continued)

OTHER PUBLICATIONS

Machine translation of KR-20140111132-A (Year: 2014).*
(Continued)

*Primary Examiner* — Colin W. Slifka
(74) *Attorney, Agent, or Firm* — Baltazar Gomez

(57) ABSTRACT

The present invention provides an oxidation catalyst composition suitable for at least partial conversion of gaseous hydrocarbon emissions, e.g., methane. The oxidation catalyst composition includes at least one platinum group metal (PGM) component supported onto a porous zirconia-containing material that provides an effect on hydrocarbon conversion activity. The porous zirconia-containing material is at least 90% by weight in the monoclinic phase. Furthermore, the PGM component can comprise at least one platinum group metal in the form of colloidally deposited nanoparticles. The oxidation catalyst composition can be used in the treatment of emissions from lean compressed natural gas engines.

18 Claims, 4 Drawing Sheets

(51) Int. Cl.
*B01J 21/06* (2006.01)
*B01J 35/00* (2006.01)
*B01J 35/04* (2006.01)
*B01J 35/10* (2006.01)
*F01N 3/10* (2006.01)
*B01D 53/94* (2006.01)

(52) U.S. Cl.
CPC ............ *B01J 35/04* (2013.01); *B01J 35/1014* (2013.01); *B01J 35/1038* (2013.01); *F01N 3/103* (2013.01); *B01D 53/945* (2013.01); *B01D 2255/102* (2013.01); *B01D 2255/1021* (2013.01); *B01D 2255/1023* (2013.01); *B01D 2255/20715* (2013.01); *B01D 2258/018* (2013.01); *B01J 2523/824* (2013.01); *B01J 2523/828* (2013.01); *Y02T 10/12* (2013.01)

(58) Field of Classification Search
CPC .................. B01J 23/44; B01J 2523/824; B01J 2523/828; B01J 35/1061; B01J 23/40; B01J 37/0211; F01N 3/103; Y02T 10/12; B01D 53/945; B01D 2255/1023; B01D 2255/20715; B01D 2258/018; B01D 2255/1021; B01D 2255/102; B01D 53/8668; B01D 53/04; B01D 53/44; B01D 53/94
USPC .......................................................... 502/242
See application file for complete search history.

(56) References Cited

U.S. PATENT DOCUMENTS

| | | | |
|---|---|---|---|
| 2003/0078161 | A1 | 4/2003 | Terashima et al. |
| 2006/0100099 | A1 | 5/2006 | Weissman |
| 2007/0014710 | A1* | 1/2007 | Gerlach ............... B01D 53/945 423/213.5 |
| 2008/0187477 | A1 | 8/2008 | Nochi et al. |
| 2016/0003118 | A1 | 1/2016 | Ito et al. |
| 2016/0097313 | A1 | 4/2016 | Im et al. |

FOREIGN PATENT DOCUMENTS

| | | |
|---|---|---|
| RU | 2388532 C1 | 5/2010 |
| WO | 2004065002 A1 | 8/2004 |
| WO | 2011/017139 A2 | 2/2011 |
| WO | 2016/057692 A1 | 4/2016 |

OTHER PUBLICATIONS

Lousteau, Cedric et al., "Catalytic wet air oxidation of ammonia over supported noble metals," Catalysis Today, 2015, vol. 241, pp. 80-85.
T. Kanougi et al., "Periodic density functional study of superacidity of sulfated zirconia," Journal of Molecular Catalysis, 2002, vol. 177, pp. 289-298.
Hirofumi Ohtsuka: "The Oxidation of Methane at Low Temperatures OverZirconia-Supported Pd, Ir and Pt Catalystsand Deactivation by Sulfur Poisoning", Catalysis Letters, Kluwer Academic Publishers-Plenum Publishers, NE, vol. 141, No. 3, Nov. 30, 2010 (Nov. 30, 2010), pp. 413-419.
Guo Qiuting et al: "Carbon templatebremoval by dielectric-barrier dischargepblasma for the preparation of zirconia",Catalysis Today, Elsevier, Amsterdam, NL, vol. 211, Apr. 28, 2013 (Apr. 28, 2013), pp. 156-161.
Yuquing Jia et al: "Selectivehydrogenolysis of sorbitol to ethyleneglycol and propylene glycol on Zr02-supported bimetallic Pd-Cu catalysts", Chinese Journal of Catalysis / Dalian Institute of Chemical Physics, vol. 36, No. 9, Sep. 1, 2015 (Sep. 1, 2015), pp. 1552-1559.

* cited by examiner

OXIDATION CATALYST FOR LEAN COMPRESSED NATURAL GAS ENGINE

CROSS-REFERENCE TO RELATED APPLICATIONS

This application is a continuation of International App. No. PCT/IB2017/052120, filed Apr. 12, 2017, which International Application was published by the International Bureau in English on Oct. 19, 2017, and claims priority to Chinese Application No. 201610232574, filed Apr. 14, 2016, each of which is incorporated by reference in their entirety and for all purposes.

FIELD OF THE INVENTION

The present invention relates generally to the field of oxidation catalysts used in the treatment of a hydrocarbon-containing exhaust gas stream and to methods of preparing and using such catalysts to oxidize methane and other lower hydrocarbons.

BACKGROUND OF THE INVENTION

Most passenger car and truck engines (automotive vehicle engines) are operated on gasoline or diesel fuel, however, there is increasing interest in use of natural gas as a fuel for automotive vehicles because it is viewed as a "clean" fuel. Natural gas comprises mostly methane ($CH_4$) and other low molecular weight gaseous hydrocarbons. It has been found that engines operated with methane or natural gas as a fuel produce lower amounts per mile of unburned hydrocarbons of the type that contribute to smog than engines operated on gasoline. The lower quantity of such hydrocarbon emissions is seen as particularly beneficial because of the corresponding reduction in the formation of ground level ozone. Natural gas can be used in a spark ignited, stoichiometric operated, gasoline-style engine; or alternatively in a compression ignited, lean operated, diesel-style engine. Since gasoline, diesel and natural gas are all hydrocarbon fuels, it would seem that operating practices and exhaust treatment techniques developed for gasoline and diesel engines would be directly applicable to methane-fueled engines. However, such is not the case.

It has been discovered that stoichiometric, natural gas (methane, $CH_4$) fueled engines when operated with three-way catalysts in accordance with gasoline-fueled engine practices; exhibit unburned methane passing through the exhaust system unoxidized into the atmosphere. Similarly lean natural gas fueled engines when operated with diesel oxidation catalysts in accordance with diesel-fueled engine practices also exhibit unburned methane passing unoxidized into the atmosphere. Although methane is not poisonous and it is not a reactive hydrocarbon in the sense that it promotes ozone formation at low altitudes; it is a greenhouse effect gas. Methane remains in the atmosphere and has approximately 30 times the atmospheric heat-reflecting effect of carbon dioxide.

Unlike higher molecular weight hydrocarbon gases, methane is not readily oxidized even in an oxygen-rich exhaust gas over the traditional noble metal catalysts. These catalysts do not become "active" to oxidize methane until heated to very high temperatures (e.g., 600° C. or higher), Since the exhaust temperature from many lean natural gas engines seldom exceeds 500° C., there remains the problem of preventing unburned methane from escaping the vehicle's exhaust system into the atmosphere. In this regard, there is a great unmet need to design and develop catalyst systems for lean compressed natural gas engines.

SUMMARY OF THE INVENTION

The present invention provides an oxidation catalyst composition suitable for at least partial conversion of methane and other gaseous hydrocarbon emissions. These oxidation catalyst compositions can be used for lean compressed natural gas engines, wherein the exhaust gas stream from such engines includes various hydrocarbons as well as sulfur species ($SO_x$). Sulfur species in exhaust are predominately in the form or sulfur dioxide, $SO_2$, and originate from combustion of organic sulfur containing hydrocarbons present in fuel and oil. These sulfur species are able to poison catalysts over time and thereby decrease its catalytic activity towards hydrocarbon oxidation. However, the catalyst composition of the present invention exhibits improved sulfur resistance and better recovery of catalytic activity post desulfation treatment compared to known oxidation catalysts in the art.

One aspect of the invention describes a catalyst composition configured for hydrocarbon conversion in a hydrocarbon-containing stream, the catalyst composition comprising a platinum group metal (PGM) component supported on a zirconia-containing material, wherein the zirconia is at least 90% by weight in a monoclinic phase. In one embodiment, the platinum group metal (PGM) component is selected from the group consisting of palladium, platinum, and combinations thereof. In one embodiment, the platinum group metal (PGM) component comprises platinum and palladium present in a weight ratio of about 1:1 to 0:1. In one embodiment, at least one of the palladium and platinum is in the form of colloidally deposited nanoparticles.

In one embodiment, the zirconia-containing material comprises of no more than 10% tetragonal phase. In one embodiment, the zirconia-containing material has a pore volume of about 0.15 to about 0.4 ml/g. In one embodiment, the zirconia-containing material has a BET surface area of about 25 to about 100 $m^2/g$. In one embodiment, the zirconia-containing material has a pore radius of about 2 nm to about 15 nm.

In one embodiment the composition comprises about 0.01% to about 6.0% by weight of platinum group metal (PGM) component calculated as metal and based on the total weight of the final metal impregnated zirconia-containing material. In one embodiment, the zirconia-containing material, after hydrothermal aging at 600° C. for 12 hours, has strong Lewis acid sites in an amount ranging from about 50 to about 150 µmoles/gram.

In one embodiment, the composition after sulfur exposure comprises a peak intensity ratio of a bridge-CO signal compared to a linear-CO absorbance signal measured by CO-DRIFT experiments, wherein the ratio of peak intensities is in the range of about 0.5 to about 2.

Another aspect of the invention describes a catalyst article comprising:
 a catalyst substrate having a plurality of channels adapted for gas flow, each channel having a wall surface; and
 a catalytic coating comprising the catalyst composition according to the embodiments of the invention.

In one embodiment, the catalyst substrate is a flow-through honeycomb substrate. In one embodiment, the honeycomb comprises a wall flow filter substrate. In one embodiment, a catalytic coating is present on the substrate with a loading of at least about 1.0 $g/in^3$. In one embodiment, the total loading of the platinum group metal (PGM) component of the catalyst composition onto the substrate is at least about 30 g/ft$^3$.

Another aspect of the invention describes a method of converting a hydrocarbon in an exhaust gas stream comprising contacting the gas stream with a catalyst composition for a time and temperature sufficient to reduce the level of the hydrocarbon in the gas stream. In one embodiment, the catalyst composition has improved sulfur resistance and recovers more easily from sulfur exposure for the conversion of methane in the exhaust gas stream.

The invention includes, without limitation, the following embodiments.

Embodiment 1

A catalyst composition configured for hydrocarbon conversion in a hydrocarbon-containing stream, the catalyst composition comprising a platinum group metal (PGM) component supported on a zirconia-containing material, the zirconia being at least 90% by weight in a monoclinic phase.

Embodiment 2

The catalyst composition of any preceding or subsequent embodiment, wherein the platinum group metal (PGM) component is selected from the group consisting of palladium, platinum, and combinations thereof.

Embodiment 3

The catalyst composition of any preceding or subsequent embodiment, wherein the composition comprises about 0.01% to about 6.0% by weight of platinum group metal (PGM) component calculated as metal and based on the total weight of the combined PGM and zirconia-containing material.

Embodiment 4

The catalyst composition of any preceding or subsequent embodiment, wherein the platinum group metal (PGM) component comprises platinum and palladium present in a weight ratio of about 1:1 to about 0.1:1.

Embodiment 5

The catalyst composition of any preceding or subsequent embodiment, wherein one or both of the palladium and platinum is in the form of colloidally deposited nanoparticles.

Embodiment 6

The catalyst composition of any preceding or subsequent embodiment, wherein the zirconia-containing material comprises of no more than 10% tetragonal phase.

Embodiment 7

The catalyst composition of any preceding or subsequent embodiment, wherein the zirconia-containing material has a pore volume of about 0.15 to about 0.4 ml/g.

Embodiment 8

The catalyst composition of any preceding or subsequent embodiment, wherein the zirconia-containing material has a BET surface area of about 25 to about 100 m$^2$/g.

Embodiment 9

The catalyst composition of any preceding or subsequent embodiment, wherein the zirconia-containing material has a pore radius of about 1 nm to about 20 nm.

Embodiment 10

The catalyst composition of any preceding or subsequent embodiment, wherein the zirconia-containing material, after hydrothermal aging at 600° C. for 12 hours, has strong Lewis acid sites in an amount ranging from about 50 to about 150 μmoles/gram.

Embodiment 11

The catalyst composition of any preceding or subsequent embodiment, wherein, after sulfur exposure, the composition comprises a peak intensity ratio of a bridge-CO signal compared to a linear-CO absorbance signal measured by CO-DRIFT experiments, said peak intensity ratio being in the range of about 0.5 to about 2.

Embodiment 12

A method of making a catalyst composition comprising combining a zirconia-containing material with a colloidal solution of at least one platinum group metal precursor such that the at least one platinum group metal is incorporated in a nanoparticulate form onto the zirconia-containing material.

Embodiment 13

The method of any preceding or subsequent embodiment, wherein the zirconia-containing material is at least 90% by weight in a monoclinic phase.

Embodiment 14

A catalyst article comprising: a catalyst substrate having a plurality of channels adapted for gas flow, each channel having a wall surface; and a catalytic coating comprising the catalyst composition according to any preceding or subsequent embodiment.

Embodiment 15

The catalyst article of any preceding or subsequent embodiment, wherein the catalyst substrate is a flow-through honeycomb substrate or a wall flow filter substrate.

Embodiment 16

The catalyst article of any preceding or subsequent embodiment, wherein a catalytic coating is present on the substrate with a loading of at least about 1.0 g/in$^3$.

Embodiment 17

The catalyst article of any preceding or subsequent embodiment, wherein the total loading of the platinum group metal (PGM) component of the catalyst composition onto the substrate is at least about 30 g/ft$^3$.

Embodiment 18

A method of converting a hydrocarbon in an exhaust gas stream comprising contacting the gas stream with a catalyst composition according to any preceding or subsequent embodiment for a time and temperature sufficient to reduce the level of the hydrocarbon in the gas stream.

Embodiment 19

The method of any preceding or subsequent embodiment, wherein the catalyst composition has improved sulfur resistance and recovers more easily from sulfur exposure for the conversion of methane in the exhaust gas stream.

Embodiment 20

The method of any preceding or subsequent embodiment, wherein the exhaust gas stream is of a lean compressed natural gas engine.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

DRAWINGS

Figure 4:
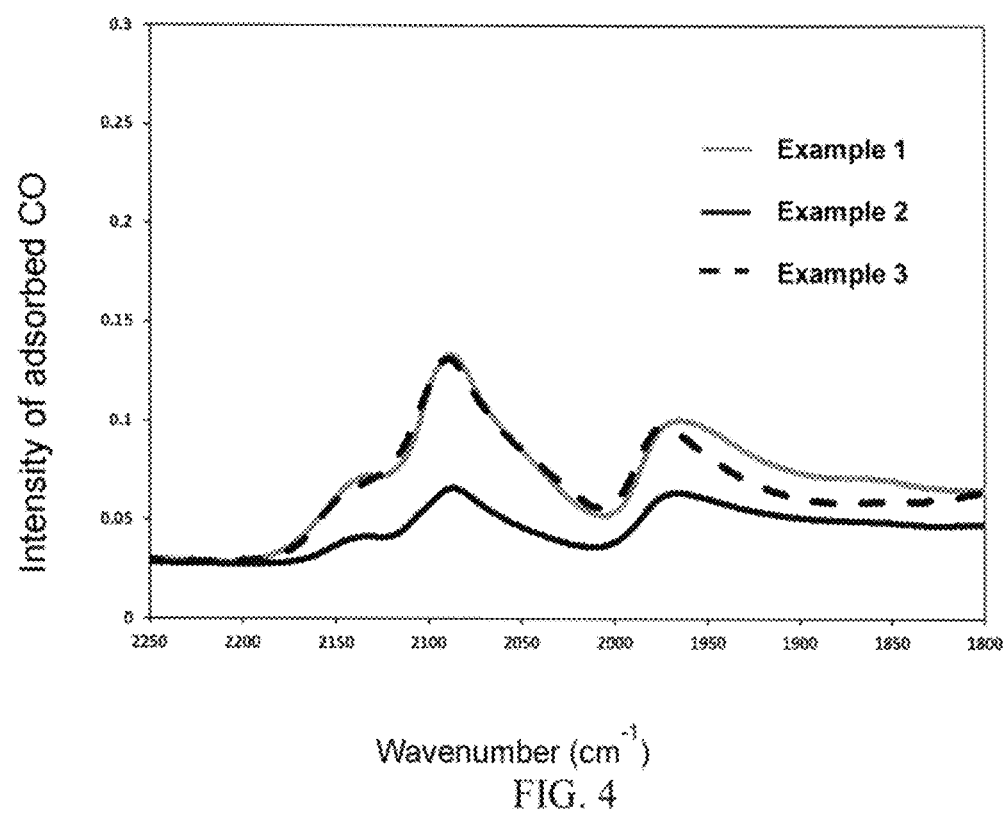
Figure 5:
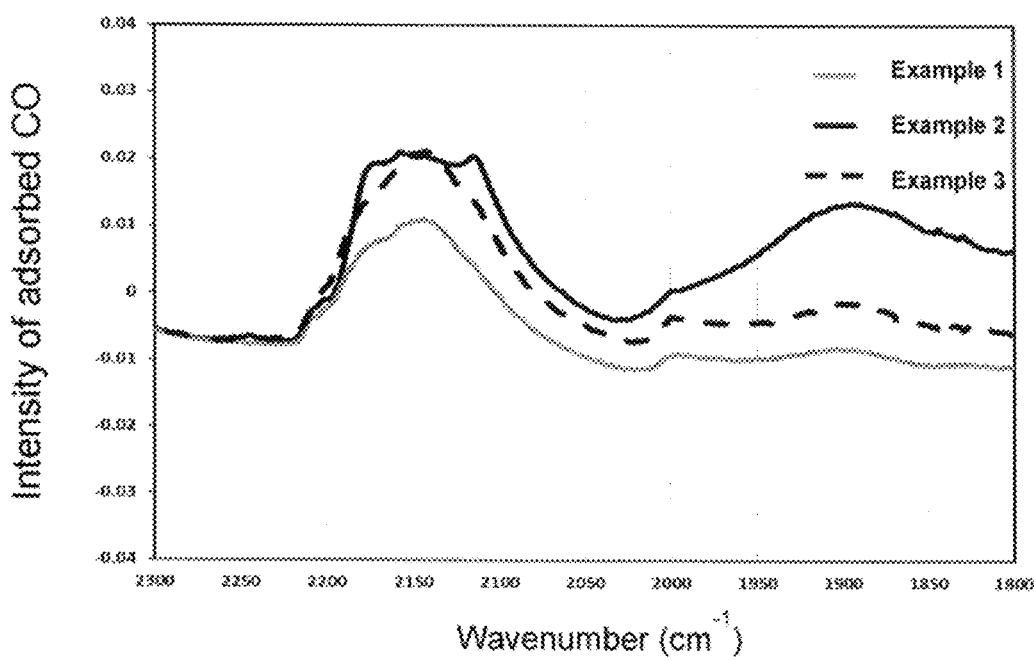
Figure 6:
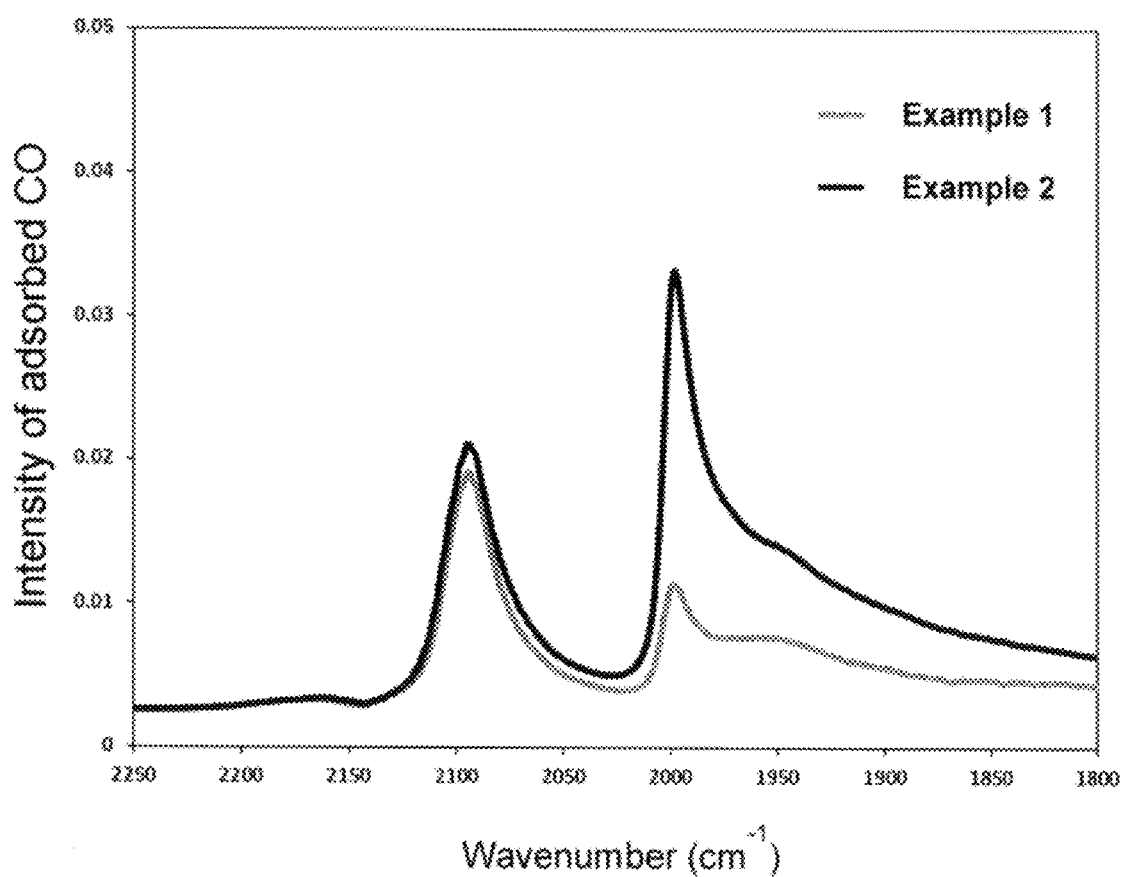

FIG. 4 a line graph showing CO-DRIFTS data for the catalyst compositions prepared in Example 1, Example 2, and Example 3, after degreening treatment and prior to sulfation;

FIG. 5 is a line graph showing CO-DRIFTS data for the catalyst compositions prepared in Example 1, Example 2, and Example 3, after sulfation; and FIG. 6 is a line graph showing CO-DRIFTS data for the catalyst compositions prepared in Example 1 and Example 2, after diesel engine aging at 650° C. for 50 hours.

DETAILED DESCRIPTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present invention provides an oxidation catalyst composition suitable for at least partial conversion of gaseous hydrocarbon emissions, e.g., methane. The oxidation catalyst composition includes at least one platinum group metal (PGM) component supported on a porous refractory oxide material. The porous refractory oxide support is defined in some embodiments in regard to its crystalline phase. The PGM component likewise is defined in some embodiments in regard to a form thereof arising from the manner in which the PGM is deposited on the support. The oxidation catalyst composition of the present invention can be used for lean compressed natural gas engines, wherein the exhaust gas stream from such engines include hydrocarbons as well as small amounts of sulfur species ($SO_x$). Sulfur species are able to poison catalysts over time and thereby decrease their catalytic activity towards hydrocarbon conversion. However, the catalyst composition of the present invention exhibits improved sulfur resistance and better catalytic activity post desulfation treatment compared to known oxidation catalysts in the art.

As used herein, the term "catalyst" or "catalyst composition" refers to a material that promotes a reaction. The catalyst may be "degreened" meaning that the catalyst was exposed to high temperature or an exhaust gas stream for a certain short amount of time to achieve a stable initial activity. The catalyst may be "fresh" meaning the catalyst is new and has not been exposed to an exhaust gas stream.

As used therein, the term "desulfation" broadly refers to any process of reversing the process of sulfation meaning at least partially removing sulfur containing species from a catalyst. Often this removal requires high energy and is accomplished under high temperature conditions. Here, the surface sulfur species includes predominantly sulfate ($SO_4^{2-}$) and some sulfite ($SO_3^{-2}$) at lower temperature; and the sulfur removed from the catalyst is mostly in the form of sulfur dioxide ($SO_2$).

As used herein, the term "stream" broadly refers to any combination of flowing gas that may also contain solid or liquid particulate matter. The term "gaseous stream" or "exhaust gas stream" means a stream of gaseous constituents, such as the exhaust of a lean burn engine, which may also contain entrained non-gaseous components such as liquid droplets, solid particulates, and the like. The exhaust gas stream of a lean burn engine typically further comprises combustion products ($CO_2$ and $H_2O$), products of incomplete combustion (CO and HC), oxides of nitrogen (NOx), combustible and/or carbonaceous particulate matter (PM) also known as (soot), and un-reacted oxygen and nitrogen.

As used herein, the term "substrate" refers to the monolithic material onto which the catalyst composition is placed, typically in the form of a washcoat, which may contain a plurality of particles containing a catalytic composition thereon. A washcoat is formed by preparing a slurry containing a certain solid content (e.g., 10-60% by weight) of particles in a liquid vehicle, which is then coated onto a substrate and dried and calcined to provide a washcoat layer. This process is called a washcoat process, wherein the substrate is coated with the slurry to form a catalytic coating onto the substrate.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

As used herein, the term "catalytic article" refers to an element that is used to promote a desired reaction. For example, a catalytic article may comprise a washcoat containing catalytic compositions on a substrate. The catalytic article may be "degreened" meaning that the catalyst was exposed to high temperature for a short certain amount of time. The catalyst article may also be "aged" meaning that the catalyst was exposed to high temperature for a longer certain amount of time representative of "full useful life".

As used herein, "impregnated" or "impregnation" refers to permeation of the soluble catalytic material into the porous structure of the support material.

As used herein, "colloidal" refers to a substance that consists of particles dispersed throughout another substance in a manner that prevents them from being filtered easily or settled rapidly e.g., a colloidal suspension/solution of a platinum group metal. For example, a "colloidal" platinum group metal (PGM) is a PGM which consists of dispersed particles, e.g., nanoparticles in homogeneous solution. In another example, a "colloidal" platinum group metal (PGM) is a PGM which consists of dispersed particles, e.g., nanoparticles, deposited onto another material such as a refractory oxide material in particle form. Hence the term "non-colloidal" refers to a platinum group metal, which is completely dissolved in a solution and is not in particle form during the impregnation process. Therefore, the same platinum group metal can exist as nanoparticles, i.e., colloidal form, or can exist in solution form, e.g., does not exist as particles but as soluble species dissolved in a solvent (non-colloidal form). A PGM deposited via a colloidal solution would thus exhibit materially different properties from a PGM deposited from a non-colloidal solution, such as from a dissolved salt. For instance, the initial PGM particle size will be independent of the washcoat loading when colloidal PGM solution is used; furthermore, the PGM particles will be in a more reduced state (more metallic).

Colloidal platinum group metal nanoparticles can be selected from the group consisting of Pt, Pd, Au, Ag, Ru, Rh, Ir, Os, alloys thereof, and mixtures thereof. In one or more embodiments, colloidal platinum group metal nanoparticles can be defined by one or more of the following: about 90% or more of the platinum group metal is in fully reduced form; the nanoparticles have an average size of about 1 to about 10 nm; at least 90% of the nanoparticles have a particle size that is within about 2 nm (above or below) of the average particle size. When transferred via an impregnation process to the surface of a refractory metal oxide, the platinum metal nanoparticles retain about the same average size and particle size distribution. The comparative catalyst prepared from non-colloidal, soluble platinum metal solution precursors, typically exhibits a significant number of particles <1 nm in size, and a bimodal distribution of particle sizes with a few particles >10 nm.

Catalyst Composition

The oxidation catalyst composition can comprise at least one PGM component and at least one refractory oxide material. As used herein, "platinum group metal" or "PGM" refers to platinum group metals or oxides thereof, including platinum (Pt), palladium (Pd), ruthenium (Ru), rhodium (Rh), osmium (Os), iridium (Ir), gold (Au), silver (Ag), and mixtures thereof. In preferred embodiments, the PGM component may comprise one or both of platinum or palladium.

In a non-limiting example, platinum and palladium may be combined in a weight ratio of about 0.1:10 to about 10:0.1, about 1:10 to about 10:1, about 3:1 to about 1:8, about 2:1 to about 1:6, or about 1:1 to about 1:4. The concentrations of the PGM component (e.g., Pt, Pd or a combination thereof) can vary, but will typically be from about 0.1 wt % to about 10 wt % relative to the weight of the total impregnated refractory oxide material (e.g., about 0.5 wt % to about 6 wt % relative to the impregnated support material), wherein the total impregnated refractory oxide support comprises the entire PGM component as well as the refractory oxide support.

As used herein, "refractory oxide material" refers to porous metal-containing oxide materials exhibiting an identifiable crystal structure or "phase", which are chemically and physically stable at temperatures associated with a lean compressed natural gas engine exhaust. Exemplary refractory oxide materials include alumina, silica, zirconia, titania, ceria, and physical mixtures or chemical combinations thereof, including atomically-doped combinations. In preferred embodiments, the refractory oxide material is zirconia. Such zirconia-containing material may be defined in that at least a portion of the zirconia is in the monoclinic form. More preferably, a majority of the refractory oxide material is zirconia is in the monoclinic form. Further specific proportionalities for the monoclinic form of zirconia are discussed below.

The monoclinic form of zirconia may not be the only form available for the refractory oxide material; however, it can be beneficial to utilize the monoclinic form according to embodiments of the disclosure. Monoclinic zirconia, for example, occurs naturally as the mineral baddeleyite. The monoclinic crystal structure provides a zirconia that has different exposed crystalline faces than conventional stabilized zirconia having the tetragonal crystal structure and therefore exhibits different catalytic properties. A zirconia refractory oxide material can be transformed from the tetragonal into the monoclinic phase using changes in temperature and pressure according to methods known in the art. For example, in some embodiments, the metal impregnated refractory oxide support is calcined at 600° C. to promote transformation into the monoclinic phase. In other embodiments, the refractory oxide material (such as a zirconia-containing material) is at least 50%, or at least 60%, or at least 70%, or at least 80%, or at least 90%, or at least 95%, or at least 98%, or at least 99%, or at least 99.5% by weight monoclinic.

In other embodiments, the refractory oxide material is no more than 10%, or no more than 9%, or no more than 8%, or no more than 7%, or no more than 6%, or no more than 5%, or no more than 4%, or no more than 3%, or no more than 2%, or no more than 1% by weight in a tetragonal phase.

The refractory oxide material is typically present in the form of a highly crystalline material, the material being at least about 75% crystalline, at least about 80% crystalline, at least about 85% crystalline, at least about 90% crystalline, at least about 95% crystalline, at least about 98% crystalline, at least about 99% crystalline, or at least about 99.5% crystalline.

The particle size of the refractory oxide material can vary. Generally, the particle size can be characterized by a D90 particle size of about 10 to about 40 microns, preferably about 10 to about 20 microns, more preferably about 5 microns to about 10 microns, most preferably about 6 microns to about 8 microns. D90 is defined as the particle size at which 90% of the particles have a finer particle size.

The refractory oxide material typically exhibits a BET surface area in excess of 1 m²/g, to about 200 m²/g, preferably from about 25 m²/g to about 100 m²/g. "BET surface area" has its usual meaning of referring to the Brunauer, Emmett, Teller method for determining surface area by $N_2$ adsorption. In one or more embodiments the BET surface area is at least about 25 m²/g, at least about 50 m²/g, or at least about 95 m²/g.

The refractory oxide material typically exhibits a pore volume in the range from about 0.05 ml/g to about 1.5 ml/g, preferably from about 0.1 ml/g to about 0.6 ml/g, more preferably from about 0.15 ml/g to about 0.5 ml/g, most preferably 0.15 ml/g to about 0.4 ml/g.

The refractory oxide material typically exhibits a pore radius in the range of about 1 to about 20 nm, preferably from about 4 nm to about 15 nm, more preferably from about 7.5 nm to about 12 nm. In some embodiments, the pore radius can be expressed as angstroms, wherein the refractory oxide material typically exhibits a pore radius in the range of about 10 angstroms to about 200 angstroms, preferably from about 40 angstroms to about 150 angstroms, more preferably from about 75 angstroms to about 120 angstroms.

In some aspects of the invention, the refractory oxide material contains Lewis acid sites, which are coordination unsaturated sites that can adsorb $SO_x$ species. These Lewis acid sites carry a positive charge due to the metal atom used to make-up of the refractory oxide material, e.g. zirconium. The strength and concentration of Lewis acid sites present depends in part on the type of metal atom used and the crystalline state of the refractory oxide material.

For example, zirconia exists in the monoclinic, tetragonal or cubic crystal system depending on the temperature. The surface acidity and basicity of the oxide is dependent on which phase is present and which crystal face is showing. Adsorption studies have shown that monoclinic zirconia is more basic than tetragonal, as it forms stronger bonds with $CO_2$. Adsorption of CO shows that the tetragonal phase has Lewis acid sites with stronger acidity than the monoclinic phase, but that it has a lower concentration of these Lewis acid sites.

Generally, surface PGM species are catalytically active, but are also subject to poisoning by sulfur, i.e., adsorption of $SO_x$ species. If surface sulfur site density can be lowered by minimizing the number of Lewis acid sites, then catalytic activity of the PGM can be maintained for longer time. In some embodiments, the number of Lewis acid sites is generally in the range of about 50 to about 1000 micromol/g, preferably about 50 micromol/g to about 550 micromol/g, more preferably about 50 micromol/g to about 300 micromol/g, most preferably from about 50 to about 150 micromol/g.

In some embodiments, the catalyst composition comprising the refractory oxide material is fresh. In other embodiments, the catalyst composition comprising the refractory oxide material is degreened (e.g., 600° C./12 h with steam air). In another embodiment, the catalyst composition comprising the refractory oxide material has been exposed to sulfur species followed by treatment using desulfation conditions.

Another aspect of the invention describes the resistance to sulfur poisoning for oxidation catalyst compositions comprising a refractory oxide material with at least 90% by weight in a monoclinic phase. Zirconia refractory oxide supports in the monoclinic phase absorbs $SO_3$ less strongly than the tetragonal phase (T. Kanougi et al, J. Mol. Catal. A, 2002, 177, 289-298). Strong sulfur absorption on the support could lead to more coverage of the PGM sites by sulfur species, as well as changing the electronic properties of the PGM particle surface through support interactions.

In another aspect of the invention, the surface area of the colloidal PGM component may be measured using CO/DRIFT spectroscopy. Carbon monoxide (CO) adsorption is typically used to probe catalyst surface structure and adsorption sites available in supported metals, metal alloys, metal oxides and metal sulfides. FTIR studies determine the amount of CO molecules able to adsorb onto the metal surface and can determine the coordination of the CO molecules with the metal surface. For example, adsorption signals around 2090 cm$^{-1}$ correspond to linear absorbed CO molecules (i.e., one molecule of CO is associated with one metal ion) onto the metal surface. An adsorption signal around 1970 cm$^{-1}$ corresponds to bridged CO molecules (i.e., two metal ions are associated with one CO molecule) adsorbed onto the metal surface.

Linear CO adsorption signals are more likely to occur on small crystallites having sites of low coordination (e.g., having the capacity to coordinate with a larger number of adsorbate molecules such as CO with less geometrical constraints), while the bridged CO molecule is more probable on large crystallites upon which highly coordinated planer sites are present.

In some embodiments, catalytic compositions comprising a PGM component, wherein at least one PGM is derived from a colloidal PGM precursor, exhibits a stronger CO adsorption signal at about 1970 cm$^{-1}$ compared to catalytic composition having the same PGM component, wherein the PGM is derived from a non-colloidal soluble PGM precursor, after exposure to sulfur species (e.g., sulfation). In some embodiments, the CO adsorption signal at about 1970 cm$^{-1}$ is at least 25% more, at least 50% more, at least 75% more, or at least 100% more for a catalyst composition comprising a PGM component, wherein at least one PGM is derived from a colloidal PGM precursor, compared to a catalyst composition comprising the same PGM component, wherein the PGM is derived from a non-colloidal soluble precursor.

In some embodiments, the catalytic composition comprising a PGM component, wherein at least one PGM is a colloidal PGM (e.g., colloidal Pd) exhibits a peak intensity ratio of bridged CO absorbance signal versus CO linear absorbance signal in the range of about 0.5 to about 2, preferably of about 0.8 to about 1.2, most preferably of about 1.

In some embodiments, the overall CO intensity of absorbance signals of bridged and linear CO may be lower due to less amount of available Pd particle surface area.

In some embodiments, the improved S-resistance can be attributed to the combination of using a refractory oxide material (e.g., containing zirconium) and further adopting such with colloidal PGM precursors to increase the overall catalytic activity of the composition (e.g., after either engine aging or sulfur aging), which could be due to initial larger PGM particles presented in the colloidal precursors that are more resistant to aging and/or negative interaction from sulfur.

Substrate

According to one or more embodiments, the substrate used for supporting an oxidation catalyst component for lean compressed natural gas engines may be constructed of any material typically used for preparing automotive catalysts and will typically comprise a metal or ceramic honeycomb structure. The substrate typically provides a plurality of wall surfaces upon which the washcoat composition is applied and adhered, thereby acting as a carrier substrate for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least about 15 wt % of the alloy, e.g., about 10-25 wt % of chromium, about 3-8 wt % of aluminum, and up to about 20 wt % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon nitride, silicon carbide, zircon mullite, spodumene, alumina-silica magnesia, aluminum titanate, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially occluding the pore openings) in addition to being disposed on the surface of the walls.

Figure 1:
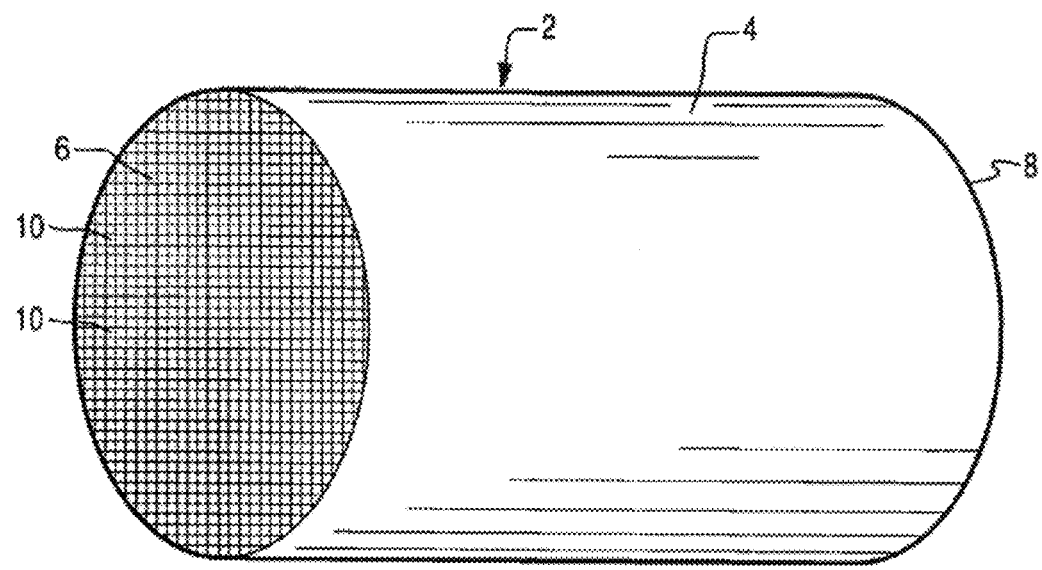
FIG. 1 is a perspective view of a honeycomb-type substrate which may comprise a catalytic article (i.e., oxidation catalyst) washcoat composition in accordance with the present invention.
Figure 2:
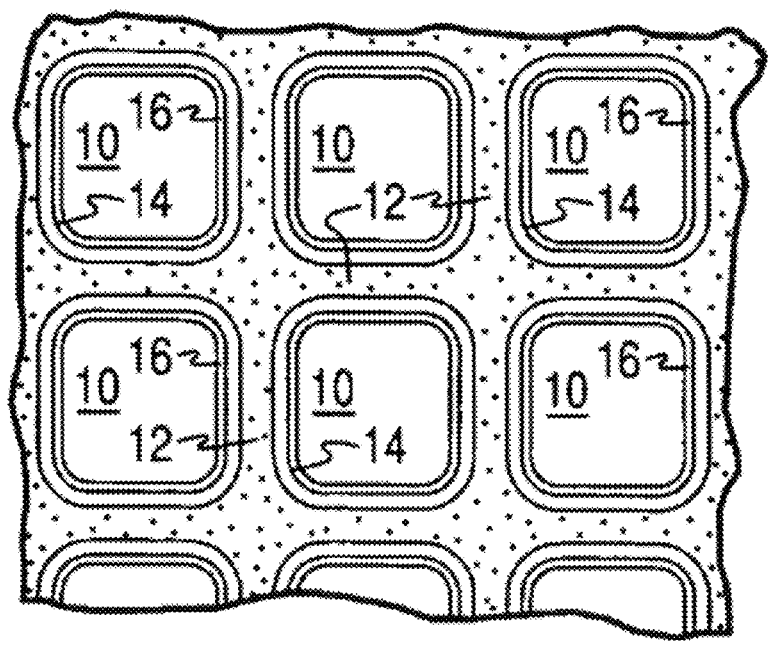
FIG. 2 is a partial cross-sectional view enlarged relative to FIG. 1 and taken along a plane parallel to the end faces of the substrate carrier of FIG. 1 representing a monolithic flow-through substrate, which shows an enlarged view of a plurality of the gas flow passages shown in FIG. 1.

FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

Figure 3:
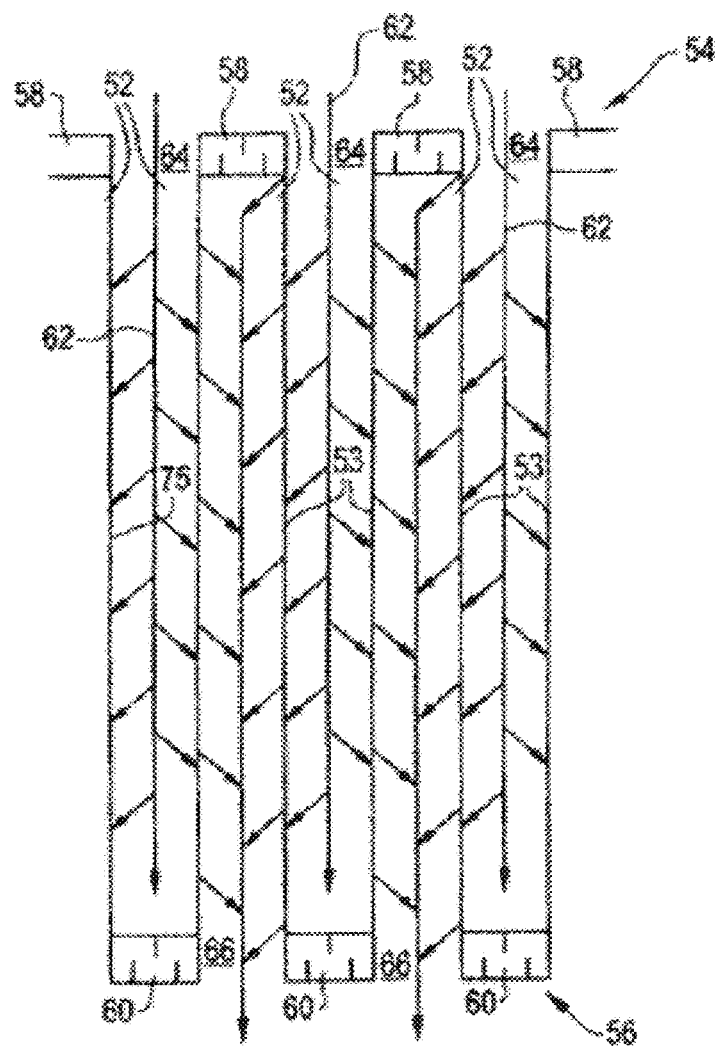
FIG. 3 is a cutaway view of a section enlarged relative to FIG. 1, wherein the honeycomb-type substrate carrier in FIG. 1 represents a wall flow filter substrate monolith.

Alternatively, FIGS. 1 and 3 can illustrate an exemplary substrate 2 in the form of a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part of the catalytic material. In some embodiments, the pores of the wall itself maybe partially filled with the catalytic material. This invention includes the use of one or more layers of catalytic material that may be within the wall, on the inlet and/or outlet walls of the element, or any combination of within or on-wall locations.

In describing the quantity of washcoat or catalytic metal components or other components of the composition, it is convenient to use units of weight of component per unit volume of catalyst substrate. Therefore, the units, grams per cubic inch ("$g/in^3$") and grams per cubic foot ("$g/ft^3$") are used herein to mean the weight of a component per volume of the substrate, including the volume of void spaces of the substrate. Other units of weight per volume such as g/L are also sometimes used. The total loading of the catalyst composition on the carrier substrate, such as a monolithic flow-through substrate, is typically from about 0.5 to about 6 $g/in^3$, from about 1 to about 5 $g/in^3$, from about 1 to about 4 $g/in^3$, or from about 1 to about 3 $g/in^3$. Total loading of the PGM component without support material (i.e., the Pt or Pd or combination thereof) is typically in the range of about 30 to about 200 $g/ft^3$, preferably 50 to about 150 $g/ft^3$, most preferably 50 to about 100 $g/ft^3$ (e.g., at least about 30 $g/ft^3$ or at least about 50 $g/ft^3$). For PGM components which comprise a combination of platinum and palladium present in a single washcoat layer or in multiple washcoat layers, the total amount of each metal present on the substrate is expressed as a weight ratio of platinum and palladium may be combined in a weight ratio of about 1:0 to about 0.1, about 1:1 to about 0:1, or about 1:2 to about 1:8.

It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Method of Making the Catalyst Composition

Preparation of a non-colloidal PGM-impregnated refractory oxide material typically comprises impregnating the refractory oxide support material in particulate form with a PGM solution, such as a platinum solution or a palladium solution, or a combination thereof. Multiple PGM components (e.g., platinum and palladium) can be impregnated at the same time or separately, and can be impregnated into the same support particles or separate support particles using, for example, an incipient wetness technique.

Incipient wetness impregnation techniques, also called capillary impregnation or dry impregnation are commonly used for the synthesis of heterogeneous materials, i.e., catalysts. Typically, a metal precursor is dissolved in an aqueous or organic solution and then the metal-containing solution is added to a catalyst support, containing the same pore volume as the volume of the solution that was added. Capillary action draws the solution into the pores of the support. Solution added in excess of the support pore volume causes the solution transport to change from a capillary action process to a diffusion process. The catalyst can then be dried and calcined to drive off the volatile components within the solution, depositing the metal on the catalyst surface. The maximum loading is limited by the solubility of the precursor in the solution. The concentration profile of the impregnated material within the pores of the refractory metal oxide depends on the mass transfer conditions within the pores during impregnation and drying.

The refractory oxide support particles are typically dry enough to absorb substantially all of the PGM impregnation solution to form a moist solid. Aqueous solutions of water soluble compounds or complexes of the PGM component may be utilized, such as palladium or platinum nitrate, tetraammine palladium or platinum nitrate, or a Pt ammine complex, or platinum acetate. Following treatment of the support particles with the PGM solution, the particles are optionally dried, such as by heat treating the particles at elevated temperature (e.g., about 100-150° C.) for a period of time (e.g., about 1-3 hours), and then optionally calcining to convert the PGM components to a more catalytically active form. An exemplary calcination process involves heat treatment in air at a temperature of about 400-600° C. for about 10 minutes to about 3 hours. The above process can be repeated as needed to reach the desired level of PGM impregnation. The resulting material can be stored as a dry powder or in slurry form.

In preferred embodiments, at least a portion of the PGM combined with the support particles is in the form of a colloidal precursor. Preparation of refractory oxide material comprising a colloidal PGM-component (i.e., a PGM component in the form of colloidally deposited nanoparticles) typically comprises applying an aqueous or organic PGM-colloidal suspension, such as a platinum colloidal suspension or a palladium colloidal suspension or a combination thereof, to the refractory oxide material. Multiple PGM components (e.g., platinum and palladium) in the form of colloidally deposited nanoparticles can be applied at the same time or separately, and can be deposited into the same support particles or separate support particles using incipient wetness techniques, or it can also be directly added to the slurry. In some embodiments, the refractory oxide material has been previously impregnated with a non-colloidal PGM prior to exposure to a colloidal PGM (i.e., a PGM component, wherein at least one PGM is in the form of colloidally deposited nanoparticles) to generate a PGM modified refractory oxide material.

When a refractory oxide material has been treated with a colloidal PGM-component the resulting PGM-modified refractory oxide material is stored as a dry powder or in slurry form.

Substrate Coating Process

The above-noted catalyst composition(s), in the form of carrier particles containing PGM-impregnated refractory oxide material, which can have a colloidal or non-colloidal PGM-component, is mixed with water to form a slurry for purposes of coating a catalyst carrier substrate, such as a honeycomb-type substrate.

In addition to the catalyst particles, the slurry may optionally contain a binder in the form of Zr acetate, colloidal zirconia, or Zr hydroxide, associative thickeners, and/or surfactants (including anionic, cationic, non-ionic or amphoteric surfactants). The pH of the slurry typically ranges from about 2.5 to about 5. Addition of acidic or basic species to the slurry can be carried out to adjust the pH accordingly. For example, in some embodiments, the pH of the slurry is adjusted by the addition of ammonium hydroxide or aqueous nitric acid.

When present, the binder is typically used in an amount of about 1-5 wt % of the total washcoat loading. The binder can be, for example, bohemite, gamma-alumina, or delta/theta alumina. Alternative the binder can be zirconia-based or silica-based, for example zirconium acetate, zirconia sol or silica sol. The slurry can be milled to enhance mixing of the particles and formation of a homogenous material. The milling can be accomplished in a ball mill, continuous mill, or other similar equipment, and the solids content of the slurry may be, e.g., about 20-60 wt %, more particularly about 30-45 wt %. In one embodiment, the post-milling slurry is characterized by a D90 particle size of about 5 to about 40 microns, preferably 5 to about 25 microns, more preferably about 5 to about 10 microns. The D90 is defined as the particle size at which 90% of the particles have a finer particle size.

The slurry is then coated on the catalyst substrate using a washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., 1-3 hours) and then calcined by heating, e.g., at about 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

The catalyst composition can be applied as a single layer or in multiple layers. In one embodiment, the catalyst is applied in a single layer (e.g., only layer 16 of FIG. 2). In one embodiment, the catalyst composition is applied in multiple layers with each layer having the same or a different composition. For example, the bottom layer (e.g., layer 14 of FIG. 2) can comprise an oxidation catalyst composition of the invention including a PGM component impregnated into a refractory oxide material and the top layer (e.g., layer 16 of FIG. 2) can comprise a catalyst composition of the invention including the same or a different PGM component impregnated into a refractory oxide component, wherein either PGM component may be colloidal or non-colloidal.

The relative amount of the oxidation catalyst composition in each layer can vary, with an exemplary dual layer coating comprising about 10-60% by weight of the total weight of oxidation catalyst composition including a PGM component in the bottom layer (adjacent to the substrate surface) and about 10-90% by weight of the total weight of the oxidation catalyst composition in the top layer.

Method of Hydrocarbon Conversion

In general, hydrocarbons present in the exhaust gas stream of any engine can be converted to carbon dioxide and water according to the equation shown below:

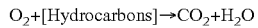

$$O_2 + [\text{Hydrocarbons}] \rightarrow CO_2 + H_2O$$

Typically, hydrocarbons present in engine exhaust gas stream comprise $C_1$-$C_6$ hydrocarbons (i.e., lower hydrocarbons), such as methane, although higher hydrocarbons (greater than $C_6$) can also be detected. As stated previously, hydrocarbons often move through the exhaust stream unmodified and when expelled to the atmosphere present an environmental hazard.

As such aspects of the current invention are directed towards a method for converting hydrocarbons, e.g. methane, in an exhaust gas stream comprising contacting the gas stream with a catalyst composition as described by the enclosed embodiments, for a time and temperature sufficient to reduce the level of hydrocarbons, e.g. methane, in the exhaust gas stream.

In some embodiments, the level of hydrocarbons, e.g., methane, present in the exhaust gas stream is reduced by at least about 60%, or at least about 70%, or at least about 75%, or at least about 80%, or at least about 90%, or at least about 95% compared to the level of hydrocarbons present in the exhaust gas stream prior to contact with the catalyst composition.

In some embodiments, the temperature required for converting hydrocarbons, e.g., methane, using the catalyst composition described in the present embodiments ranges from about 300° C. to about 650° C., from about 400° C. to about 600° C., or from about 450° C. to about 550° C.

In some embodiments, the catalyst composition is fresh. In other embodiments, the catalyst composition has been degreened. In other embodiments, the catalyst composition has been exposed to sulfur species, which can adsorb onto the catalyst composition reducing its catalytic activity towards hydrocarbon conversion. In other embodiments, the catalyst composition has been exposed to sulfur species followed by partial removal of the sulfur species from the catalyst using desulfation conditions.

In some embodiments, the catalytic composition comprises a refractory oxide material containing zirconia. In some embodiments, the refractory oxide material is monoclinic by at least 90% by weight of the refractory oxide support.

Another aspect of the invention describes a method for converting hydrocarbons, e.g., methane using catalyst compositions of the present invention, wherein the conversion efficiency is measured as a function of light-off temperature (i.e., $T_{50}$). The light-off temperature is the temperature at which the catalyst composition is able to convert 50% of hydrocarbons to carbon dioxide and water. Typically, the lower the measured light-off temperature for any given catalyst composition the more efficient the catalyst composition is to carry out the catalytic reaction, e.g., hydrocarbon conversion.

In some embodiments, the conversion of hydrocarbons, e.g., methane, comprises a lower light-off temperature for a catalytic composition comprising a PGM-component, wherein at least one PGM is derived from PGM in colloidal form, compared to a reference catalyst composition comprising the same PGM component, wherein no PGM is derived from PGM in colloidal form. In some embodiments, the light-off temperature for a catalytic composition comprising a PGM-component, wherein at least one PGM is derived from a PGM in colloidal form, is at least about 1%, at least about 2%, at least about 3%, at least about 4%, at least about 6%, at least about 7%, at least about 8%, at least about 9%, or at least about 10% lower compared to a reference catalyst composition comprising the same PGM component, wherein no PGM is derived from PGM in colloidal form. In some embodiments, the light-off temperature for a catalytic composition comprising a PGM-component, wherein at least one PGM is derived from a PGM in colloidal form, is at least about 20-30° C. lower compared to a reference catalyst composition comprising the same PGM component, wherein no PGM is derived from PGM in colloidal form.

In some embodiments, the light-off temperature for a catalytic composition comprising a PGM-component, wherein at least one PGM is derived from PGM in colloidal form, is at least 20-30° C. lower compared to a reference catalyst composition comprising the same PGM component, wherein no PGM is derived from PGM in colloidal form.

In some embodiments, the catalyst composition comprises a monoclinic zirconia refractory oxide material. In some embodiments, the refractory oxide material is at least 90% by weight monoclinic. In some embodiments, such monoclinic catalytic compositions exhibit a light-off temperature of at least 5%, more preferably at least 10%, even more preferably at least 15% lower compared to a catalyst composition comprising a refractory oxide support that is not at least 90% by weight monoclinic. In some embodiments, such monoclinic catalytic compositions exhibit a light-off temperature of at least about 10° C. to about 30° C. lower compared to a catalyst composition comprising a refractory oxide support that is not at least 90% by weight monoclinic.

In some embodiments, catalytic compositions including reference compositions are degreened. In other embodiments, the catalytic compositions and reference compositions have been exposed to sulfur species prior to contact with the exhaust gas stream. In other embodiments, the catalytic compositions and the reference compositions have been exposed to sulfur species followed by partial removal of the sulfur species from the catalyst using desulfation conditions prior to contact with the exhaust gas stream.

Another aspect of the invention is directed towards an increase in hydrothermal stability of catalytic composition comprising a PGM-component, wherein at least one PGM is in the form of colloidally deposited nanoparticles compared to a reference catalyst composition comprising the same PGM-component, wherein no PGM is in the form of colloidally deposited nanoparticles. For example, the catalytic composition and reference composition are exposed to a diesel engine aging at 650° C. for 50 hours and thereafter tested for their catalytic conversion of hydrocarbons.

In some embodiments, catalytic compositions comprising at least one PGM in the form of colloidally deposited nanoparticles exhibit a lower light-off temperature for the conversion of hydrocarbons, e.g., methane, compared to a reference catalyst composition comprising the same PGM-component, wherein no PGM is in the form of colloidally deposited nanoparticles. For example, in some embodiments, the light-off temperature for the catalytic composition is at least about 5%, or at least about 10%, or at least about 15% lower compared to the reference catalyst composition. In another example, in some embodiments, the light-off temperature for the catalytic composition is at least about 20 to about 30° C. lower compared to the reference catalyst composition.

EXAMPLES

Comparative Example: Preparation of Catalyst Article

A $\gamma$-$Al_2O_3$ material was incipient wetness impregnated with a diluted Pt amine complex solution and then dried in air at 110° C./4 h. The dried $Pt/Al_2O_3$ powder was incipient wetness impregnated with a diluted Pd nitrate solution. After thoroughly being mixed for about 15 minutes, the impregnated powder was added into DI water to form a slurry suspension. The slurry pH was adjusted with 1:1 wt/wt $HNO_3$:water to pH 4.5, and milled until the final particle size D90 reached 12-15 µm. The slurry was then coated at 40-45% solid content onto a 400/4 honeycomb substrate. After drying, the catalyst was calcined at 590° C. for 1 hour in air. The resulting washcoat loading is 1.57 g/in$^3$, and the PGM loading is 50 g/ft$^3$ and Pt/Pd ratio is 1:4.

Example 1: Preparation of Catalyst Article $ZrO_2$-A was impregnated with a diluted Pt ammine complex solution using incipient wetness techniques to afford a Pt-impregnated $ZrO_2$-A material. This material was then added into double deionized (DI) water to form a slurry suspension at ~50% solid content. A 10-15% Pd nitrate solution was added dropwise to the slurry, followed with a zirconium acetate solution at 2.5% of the total washcoat loading. The slurry pH was adjusted with base if it fell below 2.5-3. The slurry was gently milled to break down few large aggregates, and the final particle size was D90=6-8 µm. The slurry was then coated at 40-45% solid content onto a 400/4 honeycomb substrate. After drying, the catalyst was calcined at 590° C. for 1 hour in air. The resulting washcoat loading is 1.57 g/m, and the platinum group metal (PGM) loading is 50 g/ft$^3$ and Pt/Pd ratio is 1/4.

Example 2: Preparation of Catalyst Article $ZrO_2$-A was incipient wetness impregnated with a diluted Pt ammine complex solution, and then added into a diluted colloidal Pd solution (e.g., nano Pd particle size is in the range 1-4 nm) to form a slurry suspension. The procedure for colloidal Pd preparation can be found in International Patent Application No. PCT/US2015/054525, which is thereby incorporated by reference in its entirety. A zirconium acetate solution was added to the slurry at 2.5% of the total washcoat loading, and the slurry pH was adjusted with base if it fell below 2.5-3. The slurry was gently milled to break down a few large aggregates, until the final particle size D90 reached 6-8 µm. The slurry was then coated at 37-42% solid content onto a 400/4 honeycomb substrate. After drying, the catalyst was calcined at 590° C. for 1 hour in air. The resulting washcoat loading is 1.57 g/in$^3$, and the PGM loading is 50 g/ft$^3$ and Pt/Pd ratio is 1/4.

Example 3: Preparation of Catalyst Article $ZrO_2$-A was incipient wetness impregnated with a diluted Pd nitrate solution, then added into DI water to form a slurry suspension; A colloidal Pt solution was added to the slurry, followed with zirconium acetate solution (as a binder) at 2.5% of the total washcoat loading. The slurry pH was adjusted with base if it fell below 2.5-3. The slurry was gently milled to break down a few large aggregates, until the final particle size D90 reached 6-8 µm. The slurry was then coated at 40-45% solid content onto a 400/4 honeycomb substrate. After drying, the catalyst was calcined at 590° C. for 1 hour in air. The resulting washcoat loading is 1.57 g/in$^3$, and the PGM loading is 50 g/ft$^3$ and Pt/Pd ratio is 1/4. The procedure for colloidal Pt preparation can be found in International Patent Application No. PCT/US2015/054525, the nano Pt metal particle size is the range of 1-3 nm.

Example 4: Preparation of Catalyst Article $ZrO_2$-A was slowly added into a dilute colloidal Pt solution to form a slurry suspension, after thorough mixing, a colloidal Pd solution was added dropwise into the slurry, followed with zirconium acetate solution at 2.5% of the total washcoat loading. The slurry pH was adjusted with base if it fell below 3. The slurry was gently milled to break down a few large aggregates, until the final particle size D90 reached 6-8 µm. The slurry was then coated at 35-40% solid content onto a 400/4 honeycomb substrate. After drying, the catalyst was calcined at 590° C. for 1 hour in air. The resulting washcoat loading is 1.57 g/in$^3$, and the PGM loading is 50 g/ft$^3$ and Pt/Pd ratio is 1/4.

Example 5: Preparation of Catalyst Article $ZrO_2$-A was slowly added into a diluted colloidal Pd solution to form a slurry suspension; a zirconium acetate solution was added at 2.5% of the total washcoat loading. The slurry pH was adjusted with base if it fell below 3. The slurry was gently milled to break down a few large aggregates, until the final particle size D90 reached 6-8 µm. The slurry was then coated at 35-40% solid content onto a 400/4 honeycomb substrate. After drying, the catalyst was calcined at 590° C. for 1 hour in air. The resulting washcoat loading is 1.57 g/in$^3$), and the PGM loading is 50 g/ft$^3$ and contains only Pd.

Example 6: Preparation of Catalyst Powders

Each individual carrier material, $ZrO_2$-A (6A), 10% $Y_2O_3$—$ZrO_2$ (6B), 5% $CeO_2$—$ZrO_2$ (6C), AND 10% $Pr_6O_{11}$—$ZrO_2$ (6D), were incipient wetness impregnated with Pd nitrate as described in Example 1, DI water was added to set slurry at 30% solid content. A Pt ammine complex solution was added dropwise to the slurry and the pH of the resulting slurry was lowered to 4 with diluted $HNO_3$ (aq). The slurry was milled until a consistency was reached, then heated to dry while under stirring. The individual dried powder was calcined in air at 590° C. for 2 hours, generating a 3 wt % PGM catalyst powder.

Example 7: Preparation of Catalyst Powders

Catalysts containing 2% PGM at 1/4 Pt/Pd ratios were prepared using two different $ZrO_2$ materials: $ZrO_2$-A vs ZrO₂—B. The ZrO₂ material was incipient wetness impregnated with a diluted Pd nitrate solution; after shear mixing for 10 minutes, the moist Pd/ZrO₂ was added into a diluted colloidal Pt solution, to which zirconium acetate (3% of total mass) was added. After the pH was adjusted to 3 with base, the slurry was milled at 500 rpm for 10 minutes, then dried on a hot plate while under stirring. The dried powder was calcined at 590° C. for 1 hour in air. The sample contains 2% Pt/Pd at 1/4 Pt/Pd ratio.

Example 8: Preparation of Catalyst Powders

A ZrO₂-A carrier was compared with a precalcined ZrO₂-A carrier, which was calcined at 600° C./2 hours. Powder catalysts containing 4% PGM at 1/4 Pt/Pd ratios were prepared similarly as described for Example 7 and Example 8.

Example 9: Preparation of Catalyst Powders

The same preparation procedure as in Example 7 was used to prepare Example 9A, 9B, and 9C powder catalysts with Pt/Pd ratios, 1/2, 1/4 and 1/8, respectively.

Example 10: Comparison of Zirconia Carrier Versus Alumina Carrier

Coated monolith catalyst compositions prepared in Comparative Example and Example 1 of 1.5×2" dimension were degreened by thermal treatment at 550° C. for 4 hours in 10% steam air.

Sulfur aging was conducted in a feed gas mixture of 10 ppm $SO_2$, 10% by vol. $H_2O$, balance air at 450° C./25 h. The total gas flow rate was 5 L/min and the total $SO_2$ exposure is 1.7 g S/L.

Methane light-off test was carried out in a feed gas mixture of 1000 ppm $CH_4$, 400 ppm $C_2H_6$, 600 ppm CO, 150 ppm $C_3H_6$, 240 ppm NO, 5% $CO_2$, 10% $O_2$ and 7% $H_2O$ in balanced $N_2$, at SV 50,000/h. The catalyst was heated at 15° C./min ramping rate from 100 to 600° C., and $T_{50}$ values were used to compare activity.

The results are shown in Table 1. The degreened and sulfated catalyst Example 1 (ZrO₂-A) exhibited 25° C. lower $T_{50}$ values compared to the degreened and sulfated catalyst Comparative Example ($Al_2O_3$) during the 1st light-off test, and the $T_{50}$ advantage grew to 38° C. during the 2nd light-off test.

TABLE 1

| Catalyst | $CH_4$ light-off $T_{50}$, C. ° | | |
|---|---|---|---|
| | Degreened | Sulfated, 1st test | Sulfated, 2nd test |
| Comparative Example | 391 | 514 | 478 |
| Example 1 | 409 | 489 | 440 |

Example 11: Impact of Using Colloidal PGM Precursors on Zirconia for Sulfur Resistance Coated monolith catalyst compositions prepared in Examples 1-4 of 1.5×2" dimension were degreened and sulfated similarly as described above.

Degreened and sulfated catalysts were evaluated with the same light-off procedure as described above; for sulfated catalysts, the temperature was only ramped to 475° C. during the 2nd light-off test, followed with a 30 minute stabilization period at the same temperature. Transient desulfation was then conducted with five cycles of 1-minute $O_2$-off and 1-minute $O_2$-on, followed with a final 30 minute stabilization period in the light-off gas mixture.

The results are shown in Table 2. Catalyst Examples 2-4 exhibit nearly 30-40° C. lower $CH_4$ light-off $T_{50}$ after sulfation, compared to catalyst Example 1. This data suggests that colloidal PGM precursors lead to improved S-resistance of methane oxidation catalysts. The benefit of colloidal PGM precursors is also demonstrated in activities after desulfation treatment, where $CH_4$ $T_{50}$ values of catalyst Example 2-4 are nearly restored. Furthermore, the steady state methane conversion at 475° C. after desulfation is about 10% higher for catalysts Example 2 and Example 3 (79% and 80%, respectively) versus catalyst Example 1 (69%). Catalyst Example 4, which uses both colloidal Pt and colloidal Pd, exhibits further improvement, where 87% methane conversion was observed at 475° C. after desulfation

TABLE 2

Impact of colloidal PGM precursors on S-resistance & desulfation efficiency

| Test condition | Example 1 | Example 2 | Example 3 | Example 4 |
|---|---|---|---|---|
| Degreened, $T_{50}$ | 409 | 411 | 409 | 396 |
| Sulfated, $T_{50}$ | 489 | 455 | 462 | 454 |
| Desulfated, $T_{50}$ | 441 | 412 | 412 | 404 |
| $CH_4$ % at 475° C. after desulfation | 69 | 80 | 79 | 87 |

In order to understand the beneficial mechanism of colloidal PGM precursors, degreened or sulfated catalysts Example 1-3 were analyzed with CO-DRIFTS technique using the washcoat scraped from coated monolith samples.

CO-DRIFTS experiments were conducted on a Bio-Rad Excalibur FTS 3000 IR spectrometer equipped with a MCT detector and a Pike Technology environmental chamber with ZnSe windows. The samples were ground into a fine powder with a mortar and pestle, and then filled into the sample cup. The sample powder was first dehydrated at 400° C. for 1 h in flowing Ar at the flow rate of 40 ml/min and then cooled to 30° C. An Infrared spectrum was collected for the sample without probe molecule adsorption as reference. 1% of CO in Ar was introduced into the chamber. The total CO exposure time is 30 minutes. Then the sample was purged by flowing Ar for 2 minutes at 30° C. and the CO adsorption spectrum was measured.

In FIG. 4, catalysts Example 1 and 3 show overall higher CO adsorption intensity than catalyst Example 2 due to higher PGM dispersion as a result of using solution based Pd nitrate precursor. In general, colloidal PGM precursors with pre-formed nano metal particles usually result in lower initial dispersion as well as lower amount of CO adsorption. A unique feature arising from using a colloidal Pd precursor is that the ratio of bridge-absorbed CO vs linearly absorbed CO is significantly higher, which is proposed to be due to initially larger Pd particles directly inherited from the colloidal Pd precursor.

In FIG. 5, after a sulfation experiment (1.7 g/L total sulfur exposure), the total CO absorption intensity of catalysts Example 2 and Example 3 are now significantly higher than catalyst Example 1. Notably catalyst Example 2 also exhibits a significant peak at around 1900 $cm^{-1}$ which is due to bridge-adsorbed CO. The CO-DRIFTS result is in complete agreement with the activity data shown in Table 2.

Example 12: Impact of Using Colloidal PGM Precursors on Zirconia for Aging Stability Coated monolith catalyst Examples 1, 2 and 5 were subjected to diesel engine aging at 650° C. for 50 hours using ultra low sulfur diesel fuel. The methane light-off activity is compared in Table 3.

TABLE 3

$CH_4$ light-off $T_{50}$ comparison after diesel engine aging 650° C./50 h

|  | Example 1 | Example 2 | Example 5 |
|---|---|---|---|
| $CH_4$ conversion $T_{50}$ (° C.) | 462 | 420 | 423 |

Catalyst Example 2 using colloidal Pd precursor shows 42° C. lower $T_{50}$ value. Catalyst Example 5, which uses colloidal Pd only and does not contain any Pt, also exhibits similar $CH_4$ $T_{50}$ as catalyst Example 2. The washcoat of catalysts Example 1 and Example 2 were characterized with CO-DRIFTS and the comparison is shown in FIG. 6. Both examples show similar intensity of linearly adsorbed CO, however catalyst Example 2 exhibits significantly higher intensity of bridge adsorbed CO, a feature which is found in the degreened samples shown in FIG. 4. These data suggest that, compared to Pd nitrate, colloidal Pd precursor leads to more available Pd surface after hydrothermal aging and after engine aging.

When colloidal Pd is used, a higher ratio of bridge-adsorbed CO versus linearly adsorbed CO is observed at all stages of catalyst treatment, e.g., degreened, sulfated or engine aged, it appears that this feature has a strong correlation with higher activity observed with catalysts comprised of colloidal Pd. A summary of the ratio of bridge-adsorbed CO versus linearly adsorbed CO is shown in the table below.

TABLE 4

Comparison: Ratio of bridge-adsorbed versus linearly adsorbed CO

| Catalyst | Degreened | Sulfated | Engine aged |
|---|---|---|---|
| Example 1 | 0.69 | 0.42 | 0.54 |
| Example 2 | 0.96 | 0.77 | 1.3 |

Example 13: Impact of Phase Structures of Zirconia Materials

Powder samples prepared in Example 6 were tested on a high throughput testing unit. Each sample was shaped into 250-500 μm particle size, typically 100-300 mg shaped sample was used and diluted to 1 mL volume with corundum for testing. For catalyst testing, the gas composition consists of 1500 ppm $CH_4$, 200 ppm NO, 10% $O_2$, 10% $H_2O$, and 5% $CO_2$ in balance $N_2$. Degreening was carried out at 550° C. in the reaction gas (1 hour per position). Catalytic testing was performed at steady state temperature of 400, 450, 500 and 550° C. respectively, at 80,000/h space velocity. Each sample was exposed to the simulated gas mixture for 10 minutes at each temperature, and the data collected in the last 30 seconds were used for comparison.

After testing in the degreened condition, the samples were sulfated in a gas mixture of 10 ppm of $SO_2$, 100 ppm NO, 10% by vol. $H_2O$/air at 450° C. for 15 h, and then retested under the same conditions without $SO_2$.

Results are shown in Table 5. After sulfation, the catalyst based on monoclinic $ZrO_2$-A exhibits much lower light-off temperatures after sulfation compared to catalyst compositions based on doped zirconia, e.g., 10% $Y_2O_3$—$ZrO_2$, 5% $CeO_2$—$ZrO_2$, 10% $Pr_6O_{11}$—$ZrO_2$. These doped zirconia carriers appear either partially (5% $CeO_2$) or entirely (10% $Y_2O_3$, or 10% $Pr_6O_{11}$) in a tetragonal phase as determined by powder X-ray diffraction studies (XRD).

TABLE 5

Comparison of $ZrO_2$-A vs doped zirconia materials ($CH_4$ $T_{50}$, ° C.)

|  | $ZrO_2$-A | 10% $Y_2O_3$—$ZrO_2$ | 5% $CeO_2$—$ZrO_2$ | 10% $Pr_6O_{11}$—$ZrO_2$ |
|---|---|---|---|---|
| Degreened | 428 | 452 | 440 | 500 |
| Sulfated | 504 | >550 | >550 | >550 |

Example 14: Impact of Purity of Monoclinic Phase in Zirconia

Powder catalysts of Example 7 were hydrothermally aged at 600° C. for 12 hour in 10% steam air, and sulfated similarly as described above for Example 6. Additionally, lean/rich (L/R) regeneration was applied at both 450° C. and 500° C. after sulfation, and it consisted of 10 cycles of 1 minute lean mixture (same test feed) and 5 seconds rich mixture (λ=0.95). The composition of the rich mixture is CO/$H_2$ (3/1; concentration adjusted for λ=0.95), 1500 ppm $CH_4$, 200 ppm NO, 10% $H_2O$, 1% $O_2$, 5% $CO_2$, and balance $N_2$. The comparison test was conducted at 450° C., after each step in the following sequence:

Before sulfation
After $1^{st}$ sulfation
After L/R regeneration at 450° C.
After sulfation
After L/R regeneration at 450° C.
After L/R regeneration at 500° C.

Results are shown in Table 6. $ZrO_2$-A and $ZrO_2$—B catalysts exhibit different methane conversion profiles before sulfation, after sulfation, and after regeneration. The catalyst based on $ZrO_2$-A exhibits both improved sulfur resistance and desulfation efficiency. After $1^{st}$ sulfation, the $ZrO_2$-A based catalyst exhibits 33% relative decrease in methane conversion (42%→28%), compared to 82% (29%→5%) relative decrease observed for the $ZrO_2$—B based catalyst. After L/R regeneration at either 450° C. or 500° C., higher (closer to 100%) activity recovery was observed for the $ZrO_2$-A based catalyst.

TABLE 6

$CH_4$ % at 450° C. after various sulfation & desulfation treatment

| Support | Before sulfation | Sulfated | L/R desulfation 450° C. | Sulfated | L/R desulfation 450° C. | L/R desulfation 500° C. |
|---|---|---|---|---|---|---|
| $ZrO_2$-A | 42 | 28 | 55 | 11 | 30 | 41 |
| $ZrO_2$-B | 29 | 5 | 16 | 3 | 11 | 17 |

In order to understand the difference in catalytic activity, the two carriers were characterized with various surface and bulk analysis techniques. As shown in the Table 7 below, the $ZrO_2$-A carrier has slightly higher BET surface area than $ZrO_2$—B; however after hydrothermal aging at 600° C. for 12 hours, both zirconia carriers show significantly reduced surface area and become nearly identical in BET values.

TABLE 7

BET surface area of $ZrO_2$-A vs $ZrO_2$-B

| Support | | BET, $m^2/g$ | Pore volume $cm^3/g$ | Pore radius Å |
|---|---|---|---|---|
| $ZrO_2$-A | Fresh | 95 | 0.28 | 48 |
|  | Aged | 28 | 0.18 | 117 |
| $ZrO_2$-B | Fresh | 73 | 0.36 | 79 |
|  | Aged | 31 | 0.32 | 150 |

The two carriers were also compared for the amount of Lewis acid sites which are coordination unsaturated sites that can absorb $SO_x$ species. Table 8 below compares the number of strong Lewis acid sites before and after hydrothermal aging at 600° C./12 hour, which shows that after hydrothermal aging $ZrO_2$-A has 50% lower strong Lewis acid sites than $ZrO_2$—B. This result suggests that a zirconia surface with fewer strong Lewis acid sites may improve the catalyst towards S-resistance. The Lewis acid measurement is based on a pyridine absorption-desorption method using Diffuse Reflectance Fourier-transform infrared (DRIFTS) spectra. The measurements were carried out on a Perkin-Elmer Paragon 1000PC spectrometer equipped with a MCT detector and a Spectra-Tech diffuse reflectance high temperature chamber with KBr windows allowing gases such as $N_2$ to flow through. Approximately 40 mg of sample is ground into a fine powder with an agate mortar and transferred into aluminum sample cup. The samples were first dehydrated at 450° C. for 1 hour under flowing dry $N_2$ prior to pyridine adsorption. Then the samples were heated to 180 and 400° C. under flowing $N_2$ and maintained for 50 minutes, cooled and scanned. The amount of desorbed pyridine at 180 and 400° C. corresponds to weak or strong Lewis acid sites. Data is reported in µmoles/gram and the test error is ±20%.

TABLE 8

Strong Lewis acid sites of $ZrO_2$-A vs $ZrO_2$-B

|  | $ZrO_2$-A | $ZrO_2$-B |
|---|---|---|
| Fresh | 450 | 511 |
| 600° C./12 h 10% $H_2O$/air | 99 | 219 |

Furthermore, the powder XRD pattern comparison shows that $ZrO_2$-A has less tetragonal phase (7%) than $ZrO_2$—B (14%) in the fresh state; however both zirconia-based refractory metal oxides arrive at 100% monoclinic phase after hydrothermal aging.

In order to evaluate the importance of the monoclinic phase, the $ZrO_2$-A carrier was pre-calcined at 600° C. for 2 hour to render a 100% pure monoclinic phase (determined by XRD). Comparative powder samples of Example 8 were tested under the same condition as described for Example 6 in Table 5 (tested before and after sulfation).

In Table 9, the $T_{50}$ values of the catalyst using pre-calcined $ZrO_2$-A (converted to 100% monoclinic phase) are 14-20° C. lower either after degreening or after sulfation. This data suggests that a pure monoclinic zirconia phase may be beneficial for improving sulfur resistance, potentially due to the fact that $SO_3$ absorbs most weakly on the monoclinic surface (T. Kanougi et al. J. Mol. Catal. A, 2002, 177, 289-298).

TABLE 9

Impact of pure monoclinic zirconia phase

|  | $ZrO_2$-A, as-is | $ZrO_2$-A, calc 600° C. |
|---|---|---|
| Before sulfation | 428 | 412 |
| Sulfated | 460 | 440 |

Example 15: Impact of Pt/Pd Ratio on Zirconia

Powder catalysts of Example 9 with different Pt/Pd ratios, 1/2, 1/4 or 1/8 were aged in 10 vol % $H_2O$ air at 650° C. for 12 hours, followed with sulfation and Lean/Rich desulfation experiments as described for Example 7 (in Table 6). The data are summarized in Table 10. Higher Pt/Pd seems to benefit rich regeneration (ratio 1/2 and 1/4) and have better S-resistance; however increasing amount of Pt (ratio 1/2) could result in lower methane conversion activity in the absence of sulfur; The optimal Pt/Pd ratio may be close to 1/4.

TABLE 10

Effect of Pt/Pd ratio on $CH_4$ % at 450° C.

| Pt/Pd ratio | Before sulfation | Sulfated | L/R desulfated 450° C. |
|---|---|---|---|
| 1/2 | 30 | 21 | 48 |
| 1/4 | 48 | 28 | 55 |
| 1/8 | 41 | 13 | 28 |

Example 16: Comparison of Example 3 at Various Washcoat Loading and PGM Loading

Coated monolith catalysts of Example 3 can be altered with different washcoat loading (1.5-6 $g/in^3$) and PGM loading (50-150 $g/ft^3$) at fixed 1/4 Pt/Pd ratio, or the combination of both, by following the same preparation procedures as described for Example 3. A comparison of methane light-off activity as $T_{50}$ is shown in Table 11 below. Methane light-off test was carried out in a feed gas mixture of 1000 ppm $CH_4$, 400 ppm $C_2H_6$, 600 ppm CO, 150 ppm $C_3H_6$, 240 ppm NO, 0.5 ppm $SO_2$, 5% $CO_2$, 10% $O_2$ and 7% $H_2O$ in balanced $N_2$, at SV 50,000/h. The catalyst was heated at 15° C./min ramping rate from 100 to 600° C.

TABLE 11

Comparison of methane light-off $T_{50}$ at various washcoat loadings and PGM loadings (Pt/Pd ratio = 1/4)

|  | Washcoat loading $g/in^3$ | | | | |
|---|---|---|---|---|---|
|  | 1.5 | 3.0 | 4.5 | 6 | 4.5 |
| PGM loading $g/ft^3$ | 50 | 100 | 100 | 100 | 150 |
| $T_{50}$ ($CH_4$), ° C. | 406 | 415 | 383 | 426 | 377 |

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed:

1. A catalyst composition configured for hydrocarbon conversion in a hydrocarbon-containing stream, the catalyst composition comprising a platinum group metal (PGM) component supported on a zirconia-containing material, the zirconia being at least 90% by weight in a monoclinic phase, wherein the platinum group metal component consists of nanoparticles having an average size of 1 to 10 nm, wherein the zirconia has Lewis acid sites of 50 to 1000 micromol/g.

2. The catalyst composition of claim 1, wherein the platinum group metal (PGM) component is selected from the group consisting of palladium, platinum, and combinations thereof.

3. The catalyst composition of claim 1, wherein the composition comprises 0.01% to 6.0% by weight of platinum group metal (PGM) component calculated as metal and based on the total weight of the combined PGM and zirconia-containing material.

4. The catalyst composition of claim 2, wherein the platinum group metal (PGM) component comprises platinum and palladium present in a weight ratio of 1:1 to 0.1:1.

5. The catalyst composition of claim 1, wherein the zirconia-containing material comprises of no more than 10% tetragonal phase.

6. The catalyst composition of claim 1, wherein the zirconia-containing material has a pore volume of 0.15 to 0.4 ml/g.

7. The catalyst composition of claim 1, wherein the zirconia-containing material has a BET surface area of 25 to 100 $m^2/g$.

8. The catalyst composition of claim 1, wherein the zirconia-containing material has a pore radius of 1 nm to 20 nm.

9. The catalyst composition of claim 1, wherein the zirconia-containing material, after hydrothermal aging at 600° C. for 12 hours, has strong Lewis acid sites in an amount ranging from 50 to 150.

10. The catalyst composition of claim 1, wherein, after sulfur exposure, the composition comprises a peak intensity ratio of a bridge-CO signal compared to a linear-CO absorbance signal measured by CO-DRIFT experiments, said peak intensity ratio being in the range of 0.5 to 2.

11. A catalyst article comprising:
a catalyst substrate having a plurality of channels adapted for gas flow, each channel having a wall surface; and
a catalytic coating comprising the catalyst composition according to claim 1.

12. The catalyst article of claim 11, wherein the catalyst substrate is a flow-through honeycomb substrate or a wall flow filter substrate.

13. The catalyst article of claim 11, wherein a catalytic coating is present on the substrate with a loading of at least 1.0 $g/in^3$.

14. The catalyst article of claim 11, wherein the total loading of the platinum group metal (PGM) component of the catalyst composition onto the substrate is at least 30 $g/ft^3$.

15. A method of making the catalyst composition of claim 1, comprising combining a zirconia-containing material with a colloidal solution of at least one platinum group metal precursor such that the at least one platinum group metal is incorporated in a nanoparticulate form onto the zirconia-containing material.

16. A method of converting a hydrocarbon in an exhaust gas stream comprising contacting the gas stream with a catalyst composition according to claim 1 for a time and temperature sufficient to reduce the level of the hydrocarbon in the gas stream.

17. The method of claim 16, wherein the catalyst composition has improved sulfur resistance and recovers more easily from sulfur exposure for the conversion of methane in the exhaust gas stream.

18. The method of claim 16, wherein the exhaust gas stream is of a lean compressed natural gas engine.

* * * * *